(12) United States Patent
Huang et al.

(10) Patent No.: US 9,612,767 B2
(45) Date of Patent: *Apr. 4, 2017

(54) CONTEXT AWARE DYNAMIC COMPOSITION OF MIGRATION PLANS TO CLOUD

(71) Applicant: International Business Machines Corporation, Armonk, NY (US)

(72) Inventors: Yunwu Huang, Chappaqua, NY (US); Jinho Hwang, Ossining, NY (US); Dennis A. Perpetua, Jr., Jay, NY (US); Maja Vukovic, New York, NY (US); Christopher C. Young, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,558

(22) Filed: Jun. 23, 2015

(65) Prior Publication Data

US 2016/0142261 A1    May 19, 2016

Related U.S. Application Data

(63) Continuation of application No. 14/547,800, filed on Nov. 19, 2014.

(51) Int. Cl.
*G06F 9/46* (2006.01)
*G06F 3/06* (2006.01)
(Continued)

(52) U.S. Cl.
CPC ........... *G06F 3/0647* (2013.01); *G06F 3/061* (2013.01); *G06F 3/067* (2013.01); *G06F 9/5011* (2013.01);
(Continued)

(58) Field of Classification Search
None
See application file for complete search history.

(56) References Cited

U.S. PATENT DOCUMENTS 8,099,615 B2 * 1/2012 Tripathi ............... G06F 9/4818
    713/324
8,819,672 B2 8/2014 Joukov et al.
(Continued)

FOREIGN PATENT DOCUMENTS

WO    WO2014160479    10/2014

OTHER PUBLICATIONS

List of IBM Patents or Patent Applications Treated as Related, dated Jun. 23, 2015, 2 pages.

(Continued)

*Primary Examiner* — Emerson Puente
*Assistant Examiner* — Mehran Kamran
(74) *Attorney, Agent, or Firm* — Scully, Scott, Murphy & Presser, P.C.; Louis J. Percello, Esq.

(57) ABSTRACT

Context aware dynamic composition of migration plans may be provided. A request for application or image migration may be received. Target machines and associated configuration may be identified. Resources and a schedule may be allocated. An appropriate tooling for each migration action may be selected. An artificial intelligence aspect of the migration planning process may continuously replan migration based on monitored changes in the context of source or target environment.

8 Claims, 4 Drawing Sheets

(51) Int. Cl.
*G06F 9/50* (2006.01)
*H04L 12/24* (2006.01)

(52) U.S. Cl.
CPC .......... *H04L 41/08* (2013.01); *H04L 41/0816* (2013.01); *H04L 41/0896* (2013.01); *H04L 41/12* (2013.01); *H04L 41/16* (2013.01); *H04L 41/0886* (2013.01)

(56) References Cited

U.S. PATENT DOCUMENTS

| | | | | |
|---|---|---|---|---|
| 9,098,214 | B1* | 8/2015 | Vincent | G06F 9/4856 |
| 2007/0266383 | A1* | 11/2007 | White | G06F 9/4856 |
| | | | | 718/1 |
| 2008/0127182 | A1* | 5/2008 | Newport | G06F 9/4856 |
| | | | | 718/1 |
| 2008/0270564 | A1* | 10/2008 | Rangegowda | G06F 9/5088 |
| | | | | 709/212 |
| 2010/0175063 | A1* | 7/2010 | Ciano | G06F 9/4862 |
| | | | | 718/1 |
| 2011/0107148 | A1* | 5/2011 | Franklin | G06F 11/0712 |
| | | | | 714/37 |
| 2011/0131576 | A1* | 6/2011 | Ikegaya | G06F 9/455 |
| | | | | 718/1 |
| 2011/0161491 | A1* | 6/2011 | Sekiguchi | G06F 9/4856 |
| | | | | 709/224 |
| 2011/0270968 | A1* | 11/2011 | Salsburg | G06F 9/5072 |
| | | | | 709/224 |
| 2011/0314345 | A1* | 12/2011 | Stern | G06F 11/3466 |
| | | | | 714/47.1 |
| 2012/0017031 | A1* | 1/2012 | Mashtizadeh | G06F 9/45558 |
| | | | | 711/6 |
| 2012/0096134 | A1* | 4/2012 | Suit | G06F 9/5072 |
| | | | | 709/221 |
| 2012/0137285 | A1* | 5/2012 | Glikson | G06F 9/5077 |
| | | | | 718/1 |
| 2012/0151476 | A1* | 6/2012 | Vincent | G06F 9/45558 |
| | | | | 718/1 |
| 2012/0221710 | A1* | 8/2012 | Tsirkin | G06F 9/5077 |
| | | | | 709/224 |
| 2013/0007216 | A1 | 1/2013 | Fries et al. | |
| 2013/0054734 | A1 | 2/2013 | Bond et al. | |
| 2013/0091285 | A1 | 4/2013 | Devarakonda et al. | |
| 2013/0198564 | A1* | 8/2013 | Hasit | G06F 17/30079 |
| | | | | 714/16 |
| 2013/0332920 | A1* | 12/2013 | Laor | G06F 9/45558 |
| | | | | 718/1 |
| 2013/0346613 | A1* | 12/2013 | Tarasuk-Levin | G06F 9/45558 |
| | | | | 709/226 |
| 2014/0019974 | A1* | 1/2014 | Siu | G06F 9/4856 |
| | | | | 718/1 |
| 2014/0136662 | A1 | 5/2014 | Chan et al. | |
| 2014/0208049 | A1* | 7/2014 | Furusawa | G06F 3/0647 |
| | | | | 711/162 |
| 2014/0215172 | A1* | 7/2014 | Tsirkin | G06F 11/203 |
| | | | | 711/162 |
| 2014/0215459 | A1* | 7/2014 | Tsirkin | G06F 9/45558 |
| | | | | 718/1 |
| 2014/0298338 | A1* | 10/2014 | Doi | G06F 9/4856 |
| | | | | 718/1 |
| 2014/0317625 | A1* | 10/2014 | Ichikawa | G06F 9/5077 |
| | | | | 718/1 |
| 2014/0359607 | A1* | 12/2014 | Tsirkin | G06F 9/48 |
| | | | | 718/1 |
| 2015/0020059 | A1* | 1/2015 | Davis | G06F 8/60 |
| | | | | 717/171 |
| 2015/0193248 | A1* | 7/2015 | Noel | G06F 9/45558 |
| | | | | 718/1 |
| 2015/0205638 | A1* | 7/2015 | Motoki | G06F 9/5088 |
| | | | | 711/162 |
| 2015/0269002 | A1* | 9/2015 | Yoshimoto | G06F 9/5038 |
| | | | | 718/1 |
| 2015/0324217 | A1* | 11/2015 | Shilmover | G06F 9/45558 |
| | | | | 718/1 |
| 2015/0331715 | A1* | 11/2015 | Sathyanarayana | G06F 9/4875 |
| | | | | 709/226 |
| 2015/0378759 | A1* | 12/2015 | Pershin | G06F 9/45558 |
| | | | | 718/1 |

OTHER PUBLICATIONS

Office Action dated Jun. 17, 2016 received in U.S. Appl. No. 14/547,800, 44 pages.

* cited by examiner

CONTEXT AWARE DYNAMIC COMPOSITION OF MIGRATION PLANS TO CLOUD

FIELD

The present application relates generally to computers and computer applications, and more particularly to context aware dynamic composition of migration plans to cloud.

BACKGROUND

Migration of computer related components involving moving system images, application and data from one computing environment to another. Traditionally, migration techniques are selected manually based on limited information decision criteria, and are not optimized during the migration.

BRIEF SUMMARY

A method and system of providing context aware dynamic composition of migration plans may be provided. The method, in one aspect, may comprise receiving a request to migrate at least one of application and computer system image from a source environment. The method may also comprise identifying a target environment and associated configuration. The method may further comprise defining one or more contextual actions comprising a sequence of migration steps. The method may also comprise allocating resources associated with the source environment and a schedule for triggering the one or more contextual actions. The method may further comprise selecting automatically one or more migration techniques to use to implement the one or more contextual actions based on current context of the source environment and the target environment. The method may further comprise monitoring an execution of migration performed according to the allocating and the selecting. The method may further comprise, responsive to detecting one or more exceptions in the execution of migration, regenerating a migration plan.

A system of providing context aware dynamic composition of migration plans, in one aspect, may comprise a processor and a storage device. The processor may be operable to receive a request to migrate at least one of application and computer system image from a source environment. The processor may be further operable to identify a target environment and associated configuration. The processor may be further operable to define one or more contextual actions comprising a sequence of migration steps. The processor may be further operable to allocate resources associated with the source environment and a schedule for triggering the one or more contextual actions. The processor may be further operable to select automatically one or more migration techniques to use to implement the one or more contextual actions based on current context of the source environment and the target environment. The processor may be further operable to generate a script comprising the sequence of migration steps and the one or more migration techniques used in implementing the sequence of migration steps, and store the script on the storage device. The processor may be further operable to monitor an execution of migration performed according to the allocating and the selecting, and responsive to detecting one or more exceptions in the execution of migration, the processor may be further operable to regenerate a migration plan.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
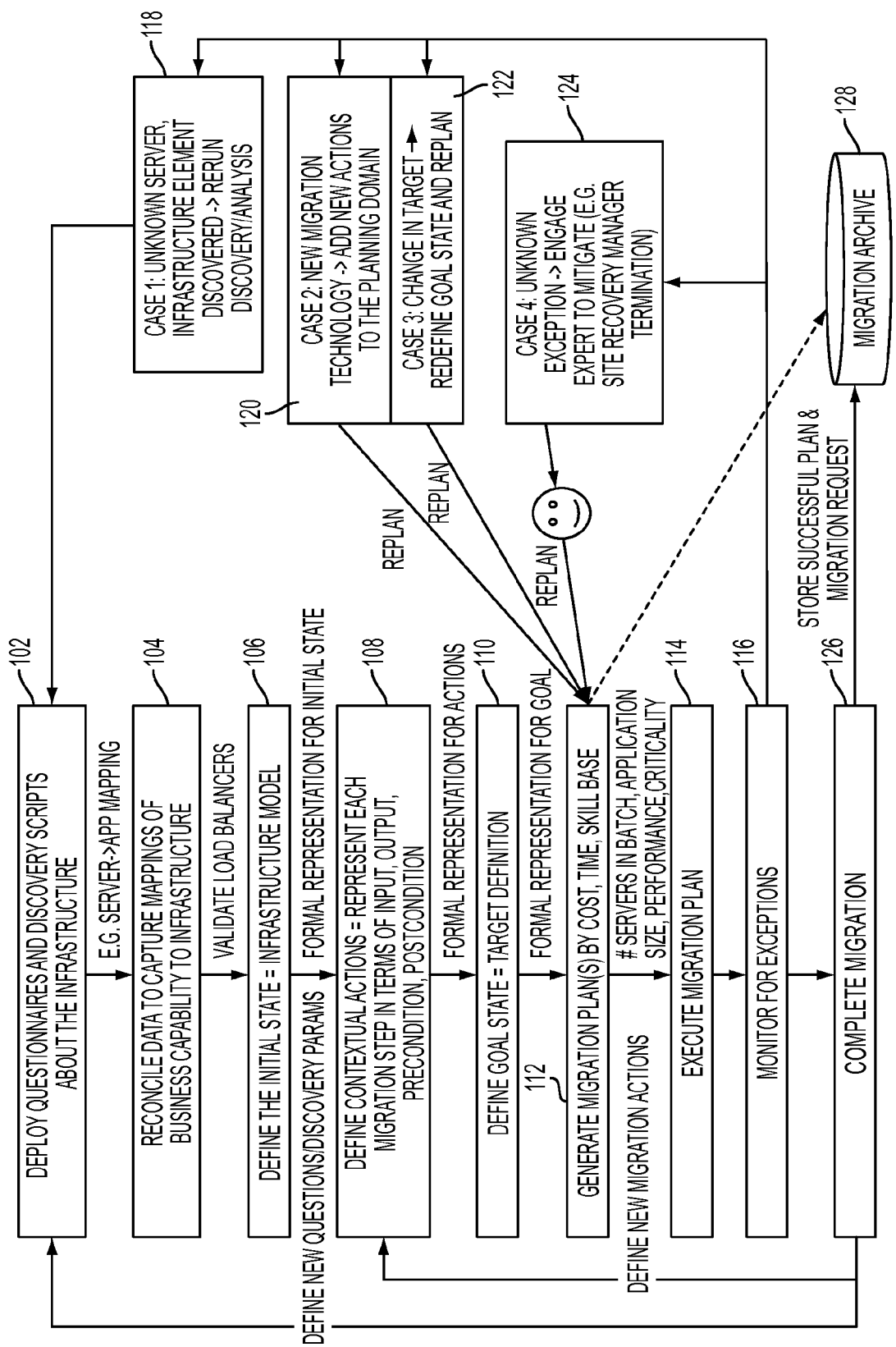
FIG. 1 is a flow diagram illustrating a method of providing context aware dynamic composition of migration plans, for example, to a cloud environment in one embodiment of the present disclosure.

Methodologies are described for intelligently selecting a migration technique based on the best known options given the current state of the migration and past performance of similar migrations. For example, a methodology of the present disclosure in one embodiment may optimize a migration technique during the migration based on the current performance. The methodologies of the present disclosure may be implemented as a system or a computer-implemented process (e.g., a method).

In one embodiment, identifying optimal set of action for migration may include the following process. The migration may be to Cloud, and the actions may be performed automatically. In another aspect, one or more of the actions may be performed manually, e.g., by a user. A request may be received for migration of an application and/or virtual machine (VM) image or another component. The target VMs and configuration may be identified. Resources and schedule may be allocated. The appropriate tooling for each step may be selected. In one embodiment, an artificial intelligence (AI) planning may be embedded into the process continuously plan or replan the migration schedule and activities, for example, including a choice of tooling, based on the migration context, and for example, changes in the context such as new server detection, updated target environment, and other changes. In one embodiment, a learning component may be embedded into the process to capture migration patterns and generate migration templates.

A method and system of the present disclosure may propose to a user, the most suitable tooling to perform migration and post-migration configuration based on the application profile, level of the skill and target VM configuration. For instance, based on information such as source workload, level of organization knowledge in the source environment (e.g., availability of knowledge), who is performing the migration, and target environment information, migration techniques or tools may be automatically selected. In one embodiment, different migration techniques or tools may be automatically selected for different phases of the migration. The method and system may work as part of a business process management (BPM) orchestrator, or as part of the Cloud management system, for example, to continuously reconfigure the application.

The method and system of the present disclosure in one aspect may include a multi-variable approach to selection of the tooling and services to be executed during migration, for example, including considering size or amount to migrate, number of servers and experience of experts tasked with the migration. Learning component may capture repeatable patterns in migration, for example, classified migration patterns, tooling and configuration issues. A feedback loop may be incorporated into the process or workflow for reconfiguration, and for example, to handle newly discovered items and/or properties during migration. As the migration is performed, the method and system of the present disclosure may identify the "next best action" given the current context, providing an automated workflow for reconfiguration.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models.

A cloud computing environment is usually service oriented with a focus on statelessness, low coupling, modularity, and semantic interoperability. At the heart of cloud computing is an infrastructure comprising a network of interconnected nodes. It is understood in advance that although this disclosure includes a detailed description on cloud computing, implementation of the teachings recited herein are not limited to a cloud computing environment. Rather, embodiments disclosed herein are capable of being implemented in conjunction with any other type of computing environment now known or later developed, as applicable.

Migration of computer systems such as information technology infrastructure transfers an operating environment to another operating environment. Migration can involve moving to new hardware, new software, or both. Data can be migrated to one type of database or data store to another. Migration to cloud may transition a company's data, applications and services from on-site premises to a cloud environment. Migration may also take place from one cloud environment to another cloud environment.

FIG. 1 is a flow diagram illustrating a method of providing context aware dynamic composition of migration plans, for example, to a cloud environment. The context aware methodology of the present disclosure may take into account the following input or context parameters in composing a migration plan dynamically.

Application:
Application technology platform (e.g., native C, Java servlet, JavaScript);
Size of application data;
Size of user data;
Rate of data change;
Sensitivity to downtime;
Operating system (OS)-level affinity (e.g., number of dependencies on the OS for the app to function);
Application subject matter expert (SME) availability (e.g., an individual familiar with application architecture);
Bitness/binary format;
Complexity in deployment;
Automation in deployment.
  Execution:
Application SME (availability/cost);
Tool/technique SME (availability/cost);
License cost.
  Source Environment:
Existing runtime environment/platform;
Ability to install software/change the infrastructure;
Sensitivity to increased network load.
  Target environment, e.g., target Cloud:
Interfaces offered (e.g., for application/data ingestion);
Cost for operations.
  Connectivity:
Network-level affinity (e.g., number of services accessed in the general network environment);
Network connectivity to target/destination (type, reliability, throughput);
Geographic distance to destination.
  Migration Goal:
Source to target platforms (like-for-like, cross-platform);
Number of components to be migrated.

The above inputs, context parameters refer to actions that can be selected at 112 in FIG. 1. One can treat them as preconditions and inputs to be met, for the action to be applicable in the given context. For example, if there is a set of similar machines, with Linux OS, which can be migrated all at once (belong to same application, or have same level of priority), VMware™ site recovery manager can be used. For example, as will be explained below, FIG. 1 at 112 selects migration techniques. In one embodiment, they may be encoded in different plan actions that are executed based on the context. For example, if there is a set of VMware™ images that can be migrated together, VMware™ Site Recovery Manager tool can be used to move them in bulk (in parallel).

The process shown in FIG. 1, for example, may be performed, in response to receiving a request to migrate, e.g., an application or image (e.g., computer system image). At 102, questionnaires and discovery scripts may be deployed to obtain information about an infrastructure that includes one or more components to be migrated. This infrastructure is referred to herein as a source infrastructure. At 102, all knowledge may be gathered about the existing applications and the underlying infrastructure that supports them. For example, information such as server to application mappings or application to server mappings may be discovered, for instance, which server is running which application, and configuration information about the server. Further, at 102, several or all of the based information for input or context parameters described above may be obtained.

At 104, the data or information discovered at 102 may be reconciled to capture mappings of business capability to infrastructure. Mappings of business capability to infrastructure refer to mappings of source servers to source business applications, e.g., Server1, Server2, and Server3 to host Application A. This input may drive the decision about the target environment. For example, an application provides some business capability which then drives underlying technical requirements. So for example, if a business deems that an application must be highly available then the target environment must provide some facility to achieve the deemed levels of availability, which may or may not be realized through load balancers. Reconciling may include a process of removing duplicate data from questionnaires and any inconsistencies. A process of reconciling may also combine the various sources of information received through questionnaires and discovery script outputs. For example, reconciling may include the ability to prioritize the trustworthiness of each input source and method (e.g., in questionnaire by person A vs. person B, or script output A vs. script output B). In the event that the same piece of information is "asked" several times and different responses are received, this process may look to the most trusted source and use the source determined to be the most trusted source. In another embodiment, a voting type system may be used, where the most frequent answer is assumed to be the most correct.

At 106, initial state of a source infrastructure is defined. For example, a source infrastructure model is defined in terms of a formal representation in initial state. A process at 106, for instance, may formally capture the source environment into a representation using AI planning formalism/language. Initial state may specify properties about the source infrastructure, e.g., properties associated with servers, applications, operating system. An example of initial state may be specified as follows: Server 1, Server 2, Server 3 belong to App A; Server 1 and Server 2 are Linux OS, Server 3 is Win OS. More properties may be added about the servers and their relationships and types, e.g., Server 1 is production, Server 2 is backup, Server 3 is development server.

At 108, contextual actions are defined. For example, a contextual action represents a migration step in terms of input, output, precondition, and post-condition. A series of contextual actions may be defined for achieving the desired migration, each migration step based on the current context, which may be described in the input, output, precondition, and post-condition. Formal representation for actions may be generated. A subject matter expert may initially define contextual actions. Scripts may be generated, e.g., in combination with an automatic learning mechanism that "learns" and automatically adds new actions or modifies actions in the defined contextual actions as the system evolves. Scripts may include a number of technical actions required to complete each migration step. It could be executed manually or automatically (e.g., script in the sense of the script for an actor as well as script in the sense of script for the UNIX bash interpreter). For example, a user may implement one or more of the technical actions specified in the automatically generated script. In another aspect, machine may automatically execute one or more of the technical actions specified in the automatically generated script. In one aspect, scripts may be available as standard operating procedures, run books or best practices. In one embodiment of the present disclosure, the learning aspect may be able to generate new or augment existing actions based on results of other migrations. For example, a better quality input may be learned which may drive more successful migration results, and the learning may update the existing action with the revised input.

At 110, a goal state may be defined. The goal state may include a target definition that may specify target system's configurations. The target definition defines the target environment and/or infrastructure and its properties. Thus, at 110, the target VM and/or configuration may be defined. In one aspect, the target definition may serve as the blueprint for what the target infrastructure and applications should look like once the migration is completed. This may include aspects such as networking, storage and compute. The goal state may "mirror" the aspects of the source environment but through the lens of the migration to result in the target environment. In one aspect, the target definition may be defined by a subject matter expert, who may use other tools, to decide an optimal target environment. For example, a target definition may specify to merge source servers, e.g., development server Server3 and backup server Server 2 may be merged into one server in the target environment. A formal representation for a goal state may be generated.

In one aspect, this decision process is aided by the discovery/questionnaires but can be influenced by outside factors. One or more of this goal state may be automated (e.g., make a new target environment look as close as possible to my existing source environment) in which case the system may try to find the best match for each component (e.g., if there are 3 CPUs in the source then there will be 3 CPUs in the target). Outside knowledge may influence this decision, e.g., via an SME (e.g., Application A is going to be retired in 6 months, expected linearly declining usage and thus reduce the resource allotment).

At 112, one or more migration plans are generated, for example, by cost, time, and skill base. In one embodiment of the present disclosure, a plan is generated by AI planning algorithm. Planning includes a process of constructing action sequences that can be executed in a given initial state to achieve a desired goal. Planning systems generate sequences of actions, called plans, which can transform an initial state of the world to a desired goal state. The domain knowledge that planners use to devise a plan includes information about the available actions, the conditions under which an action applies, termed preconditions, and the expected outcomes of applying that action, called postconditions or effects.

A plan in one embodiment may include a combination of all of the knowledge to date to enable a successful realization of the future, target environment, state. The plan aggregates a set of actions and the context around the execution of those actions (such as how much they cost to license, the skill level of the person to execute them, the time duration associated with their execution, the risk associated with the underlying technology, and other). The processing at 102 to 110 supports the building of this detailed migration plan that can be concretely performed to move from source to target.

For example, a migration plan may be generated based on the number of servers in batch, application size, performance, and criticality. For example, one might want to move the least business critical servers first because the first migrations may be assumed to have the highest risk. As another example, one may want to move the most business critical servers first for a reason that an existing datacenter is suffering from imminent failure. In this way, the creation of the plans may be sliced into logical groupings. The generated migration plan may be stored or archived in a storage device 128.

At 114, the generated migration plan is executed.

At 116, the execution of the generated migration plan is monitored, for example, for exceptions. An example of an exception may include a discovery of unknown components as shown at 118, e.g., unknown server or infrastructure element, e.g., in the source system that is being migrated. In this case, the process may return to 102 to rerun the discovery and analysis of the source system.

Another example of an exception may include a new migration technology as shown at 120. For example, a system may detect that there is a new action, related to the new migration technology, entered into the domain description (list of available actions that the planner can use). Consider an example in which, midway through a migration, a migration tool company releases a new version of their product that includes some new feature. In that example, a new action is created to represent this new feature and thus the plan needs to be revisited to see how it would look taking into account this new capability. As another example, one may be using a database migration tool to move the data stored in an ABC database on a source to an XYZ (newly released) database on the target. At the initial time of planning the tool did not support XYZ (newly released) database, and thus the migration was performed using a less efficient method.

Responsive to detecting an exception involving a new migration technology, a replanning of the migration plan may take place by returning to the processing at 112. The replanning may include adding new actions to the planning domain. As another example of adding new action, consider the following. For example, if suddenly the migration system supports a migration tool X, actions to capture this activity may be added to the planner. Other examples of actions may include cost-based analysis actions, or cloudability actions, e.g., whether a server/workload qualify for migration to Cloud.

Yet another example of an exception may include a change in the target system as shown at 122, for example, low performance of the target environment, unavailability of certain server instances, types, profiles. Another example of a change in the target system may include an introduction or removal of technologies offered by the target. For example, in the Cloud scenario, a Cloud vendor may decide to offer a new type of storage (e.g., more reliable, faster, lower cost) that should then be taken into account when defining the migration plan. Likewise, the target may also provide new features that provide more automation capabilities for the migration (e.g., a Cloud vendor releases a new security scanning tool that would avoid the migration team from manually performing security checks post migration). Responsive to detecting an exception, the goal state of the target may be redefined, and the processing may return to 112 to regenerate the migration plan based on the redefined target definition.

An exception may also be an unknown one as shown at 124. In this case, an expert may be engaged to mitigate the effect of the exception, and the processing may return to 112 to continue with the generation of a migration plan based on one or more mitigating suggestions of the expert. An example of a mitigating action may include a Site Recovery Manager (SRM) termination or a termination of like product or tool. SRM is a VMware™ product that aids in the movement of virtual machine images between different infrastructure hosts.

At 126, the migration completes. The successful plan, e.g., the plan that completed the migration and the associated migration request may be stored in a storage device, e.g., 128. New migration actions may be defined, for example, by returning to the processing at 108. For example, in one embodiment of the present disclosure, migration can continue and be applied even in the steady state. For instance, once the desired components are migrated from source to target environments, a methodology in one embodiment of the present disclosure continues monitoring the target environment for any issues and "re-migrates" to a new target if necessary. This aspect provides for continual environment optimization through migration. In another aspect, new questions and discovery parameters may be defined by returning to the processing at 102, for instance to continue monitoring and possibly replanning the migration based on the monitoring.

Figure 2:
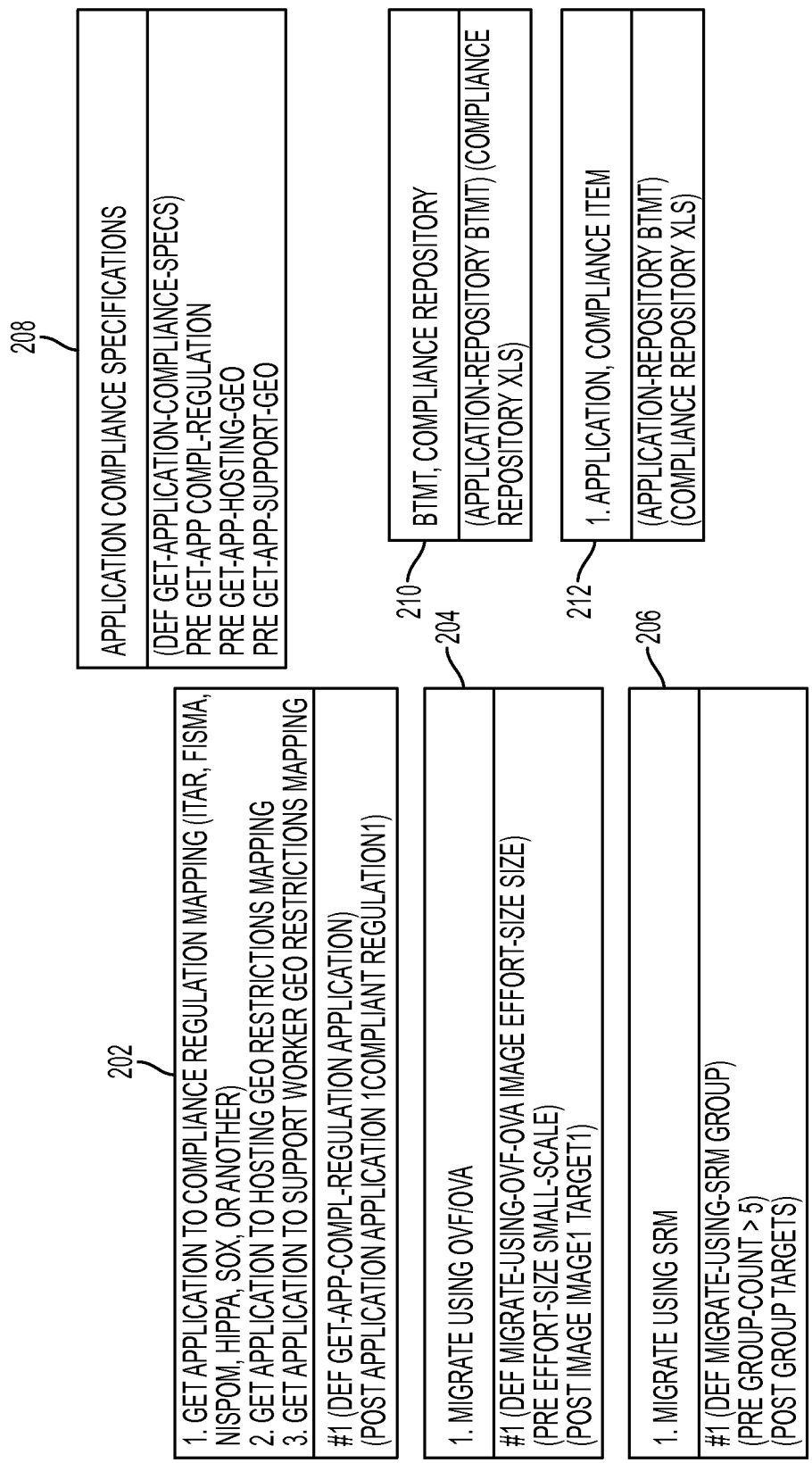
FIG. 2 shows examples of migration actions represented in terms of input, output, preconditions and effects in one embodiment of the present disclosure.

In one embodiment, an artificial intelligence (AI) planning may be applied to coordinate migration and act on contextual changes. A goal state, for example, may specify that Application X be migrated to S1, S2, S3 with load balancer between S2 and S3. In domain description, migration actions are represented in terms of input, output, preconditions and effects. FIG. 2 shows examples of migration actions represented in terms of input, output, preconditions and effects. For instance, shown at 202 are planning actions that capture properties of source environment. For example, "Get Application to compliance regulation mapping (ITAR, FISMA, NISPOM, HIPAA, SOX, or another)" obtains the level of compliance required by the application (e.g., is there a financial or healthcare application in question and what are the requirements for compliance). "Get application to hosting geo restrictions mapping" determines whether an application hosts sensitive data that can only be hosted in a given geography (e.g., XYZ bank will not allow the data to be in the cloud of ABC geographical location). "Get application to support worker geo restrictions mapping" determines whether the servers will be supported by worker at certain geographic location. An example representation for this action may be "1 (def get-app-compl-regulation application (post application application 1 compliant regulation1)." This refers to invoking an application to get compliance regulations for application (application 1) and to store them in variable regulation 1.

An example migration action 204 may include "Migrate using OVF/OVA." Open Virtual Machine Format (OVF) refers to a name of a packaging format standard, and to a package when distributed as a group of files. An open virtual appliance or application (OVA) refers to a single file distribution of the same file package, stored in the Tape Archive (TAR) format.

Similarly, examples of migration actions and corresponding representations are shown at 206, 208, 210 and 212.

AI planning in one embodiment may include the following. Given an initial state (e.g., source environment and knowledge of domain), goal state (e.g., target environment), and available actions (e.g., migration activities), AI planning finds a sequence of actions to reach the goal state (e.g., automatically compose and/or transform a migration plan).

The following description provides example use cases for migrating components and during which one or more exceptions may be detected and acted upon, according to one embodiment of the present disclosure. An example of a goal may be to migrate a dynamic apache or php web site to a target place. An approach used may be an application migration. In this example, web files may be identified that are to be copied. The files may be copied via a file transfer protocol (ftp) to the target place. The web site at the target place may be tested. It may be noticed that a web server module is missing. In response, the required web server module (missing module) may be installed. It may be also noticed that some or all of the underlying custom operating system (OS) libraries are missing. Changes may be detected. Image migration may be pursued. This description provides example changes that are detected during the migration and how replanning may be provided to have those OS libraries installed so that migration successfully completes. This scenario provides an example of a processing shown at 118 in FIG. 1. Several exceptions are encountered, which require or trigger the revision of actions which lead to replanning and future migrations to proactively avoid the issue of missing module and library.

As another example of processing at 118 in FIG. 1, a goal may be to migrate a dynamic apache or php web site and an approach used may be an application migration as in the above example. DoubleTake™ Move may be initiated to migrate application data. It may be discovered that disks reside within Veritas Cluster Manager (from Symantec Corporation, Mountain View, Calif.). An issue with a server may be detected. Source server may be removed from cluster. DoubleTake™ Move may be re-applied.

As another example, a goal set may be to migrate a server from a virtual machine to the cloud. An approach may include image migration. An image of source server may be captured. Transfer of source server to the cloud may be initiated. Network performance may be monitored. It may be determined that the network performance is insufficient for change window. At this point, a change in migration type may be detected. In response, workload migration may be pursued. A new server may be created in the cloud. Data migration may be performed of only application. In this example, a replan action includes moving from server based image migration to workload based migration. This example illustrates exceptions enumerated in FIG. 1 at 118, 120 and 122, e.g., in terms of where the problem might be (e.g., source network that may be slow, intermediary network or target network). This example shows how an exception may result in a replan, which then leads to a new approach being applied.

As another simple example, consider that a user obtains a new laptop and would like to move the user's documents to it. One approach may be to take an image or copy of the entire existing laptop and restore it onto the new laptop, e.g., including the OS, all of user's applications, and others. In the event the user only wants the user's documents (e.g., applications), an approach may be to search for the document files and copy those individually. This is an example of application or workload migration.

Another example of a goal may be to migrate rails application to the cloud. An approach may be to migrate from source OS server a platform as a service (PaaS) model of the cloud. Application is migrated to the platform as a service model of the cloud. Application is tested. A failure is recognized in a required gem (package) due to missing OS libraries (e.g., limitation of PaaS offering, cannot install gem). A change or a central point that needs to be addressed may be detected. In response, a virtual server is created on the cloud. Missing packages/gems are installed. Application is migrated and tested. In this example also, changes are detected during migration and a replanning is performed to successfully execute the migration (e.g., installing missing gems/packages in this example). This scenario illustrates an example exception in FIG. 1 at 118. In this example, an exception may drive a whole new target environment to be selected, e.g., rather than moving the application to XYZ cloud platform, move into ABC cloud infrastructure's virtual servers.

Migration techniques may include physical migration, image migration, application/workload migration, and data migration. Physical migration may include moving a physical server from one location to another, e.g., physically migrating a source server to a target data center.

Image migration may include moving an entire virtual machine and/or server as a single atomic entity, for example, moving a VMware™ server from source to target, converting a source physical server to a virtual machine on the target. Example of existing tools for performing this type of migration may include VMware™ Converter (from VMware™, Inc., Palo Alto Calif.), PlateSpin™ Migrate (from PlateSpin™, Toronto, Canada), Storix™ SBadmin (from Storix™, San Diego, Calif.), VMware™ Site Recovery Manager (from VMware™, Inc., Palo Alto Calif.).

Application and/or workload migration may include moving a limited subset of an application runtime (target the least amount of components to move), for example, moving only the WAR (Web application ARchive) file for a web application, moving only the application binary code. Example of tools for performing this type of migration may include Windows™ Server 2012 Migration Tools (from Microsoft™ Corporation, Redmond, Wash.), ftp/scp/rsync, DoubleTake™ Move (from Vision Solutions Inc., Irvine, Calif.).

Data migration may not recreate any runtime, but transfer the data associated with the application, for example, move only the static HTML files for a web site. Example of tools for performing this type of migration may include IBM™ Aspera (from International Business Corporation, Armonk, N.Y.), Softek TDMF (from International Business Corporation, Armonk, N.Y.), SanXfer Data TranXfer (from InQuinox, Austin, Tex.). Data migration approaches may include host based file level, host based block level, network based file level, network based block level, storage/array based block level approaches.

Figure 3:
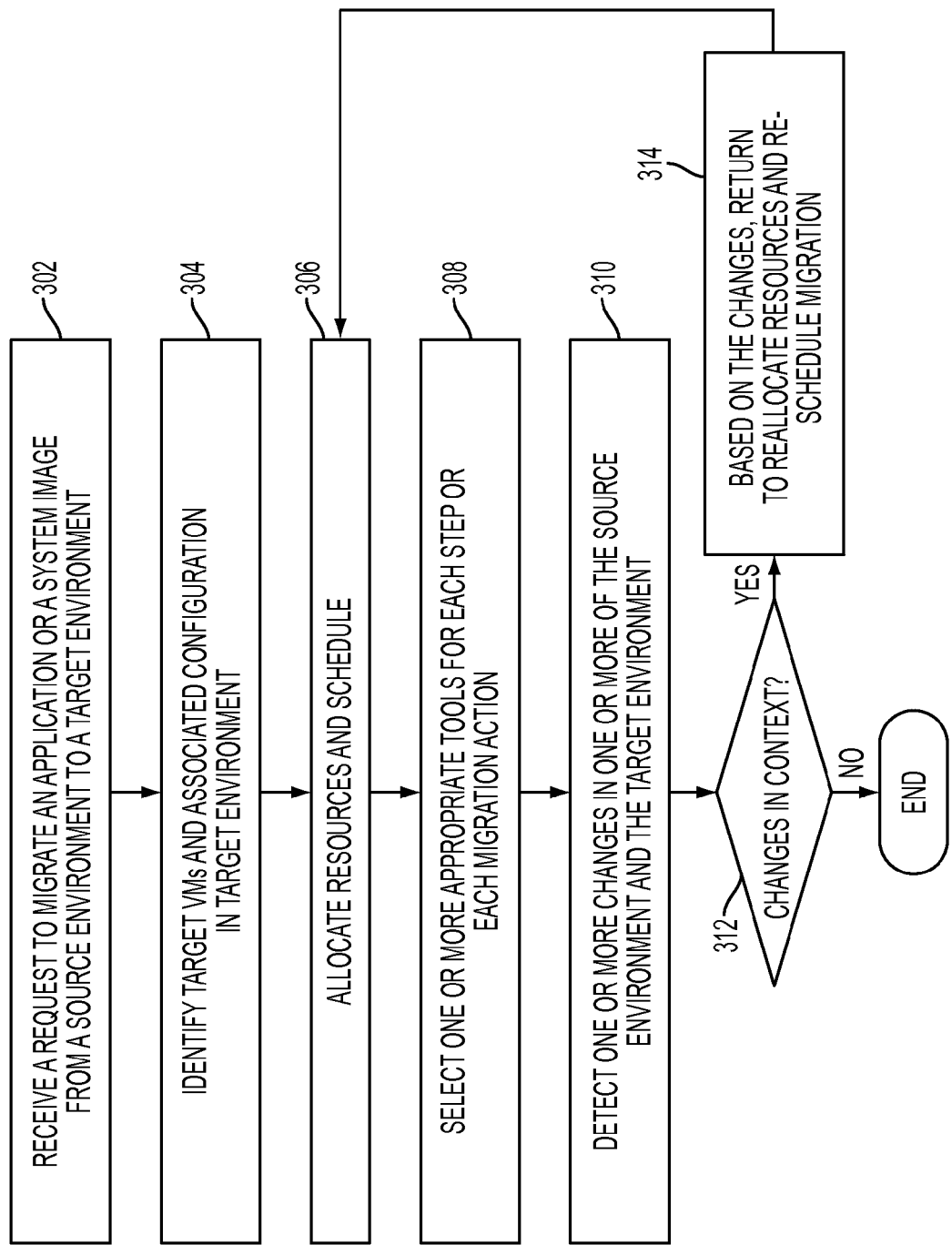
FIG. 3 is a flow diagram illustrating an overview of a methodology for context aware migration planning in one embodiment of the present disclosure.

FIG. 3 is a flow diagram illustrating an overview of a methodology for context aware migration planning in one embodiment of the present disclosure. At 302, a request is received to migrate an application or a system image from a source environment to a target environment. A user interface may be provided that allows a user to enter such requests. For instance, the user may enter the name of the application or image, source and target environments for migration, initially.

At 304, target environment, e.g., target VMs and associated configuration in target environment may be identified. This may include checking the capacity and/or type of the target servers, checking and/or sizing source servers to fit target, and checking OS compatibility. For example, all aspects or attributes needed to ensure that the application can continue to function properly post migration may be checked. Examples may include specifying the number of central processing units (CPUs), amount of memory, amount of disk, speed of network, a version of operating system. This processing, for example, defines target definition as described with reference to FIG. 1 at 110.

One or more contextual actions comprising a sequence of migration steps may be also defined as described above. At 306, resources and schedule are allocated. For example, resources associated with the source environment may be allocated and a schedule for triggering the one or more contextual actions may be allocated or defined. Examples of processing performed at 306 may include identifying available worker, identifying criticality of servers and applications, their maintenance windows and a point of time (e.g., when) a migration can be triggered.

At 308, one or more appropriate tools for each step or each migration action may be selected, for example, based on the current context. For instance, one or more migration techniques may be selected automatically to implement the one or more contextual actions based on current context of the source environment and the target environment.

Execution of migration, for example, performed according to the allocating and the selecting, may be monitored. At 310, one or more changes or exceptions in one or more of the source environment and the target environment may be detected.

At 312, if changes are detected, at 314 based on the changes, the logic of the method may return to the processing at 306 to reallocate resources and schedule for migration, e.g., to regenerate a migration plan. Otherwise, the process may end, or return to 302 for another migration planning.

In one embodiment of the present disclosure, the generating of migration plan, e.g., at 306 may include using a learning component embedded into the generating process to capture migration patterns and generate migration templates. Migration templates are patterns that capture one or more steps (e.g., determined to be key steps) that apply in the given context, which can be reused in future. Learning components may be system modules that implement one or more learning mechanisms. For instance, Active Learning is defined as "a special case of semi-supervised machine learning in which a learning algorithm is able to interactively query the user (or some other information source) to obtain the desired outputs at new data points". Over the time, one can update migration templates based on the observed and/or historical data and the user input.

As described above, a methodology of the present disclosure in one embodiment may generate a set of dynamically adaptable actions for migration, for example, to the cloud. A template comprising sequences of actions executed to achieve a migration goal may be also generated. Those actions may include selection of the target environment and identification of appropriate migration toolings. A methodology of the present disclosure in one embodiment may provide a multi-variable approach to selection of the tooling and services to be executed during migration. A learning component may capture repeatable patterns in migration (classified migration patterns, tooling and configuration issues), which may be used as a feedback mechanism to workflow/migration reconfiguration. The learning component or methodology of the present disclosure may be used to actively and dynamically adapt the migration process depending on the discovered application context. Even during the application runtime and migration execution, new extensions (e.g., servers) may be discovered, which may necessitate adaptation of migration process.

Figure 4:
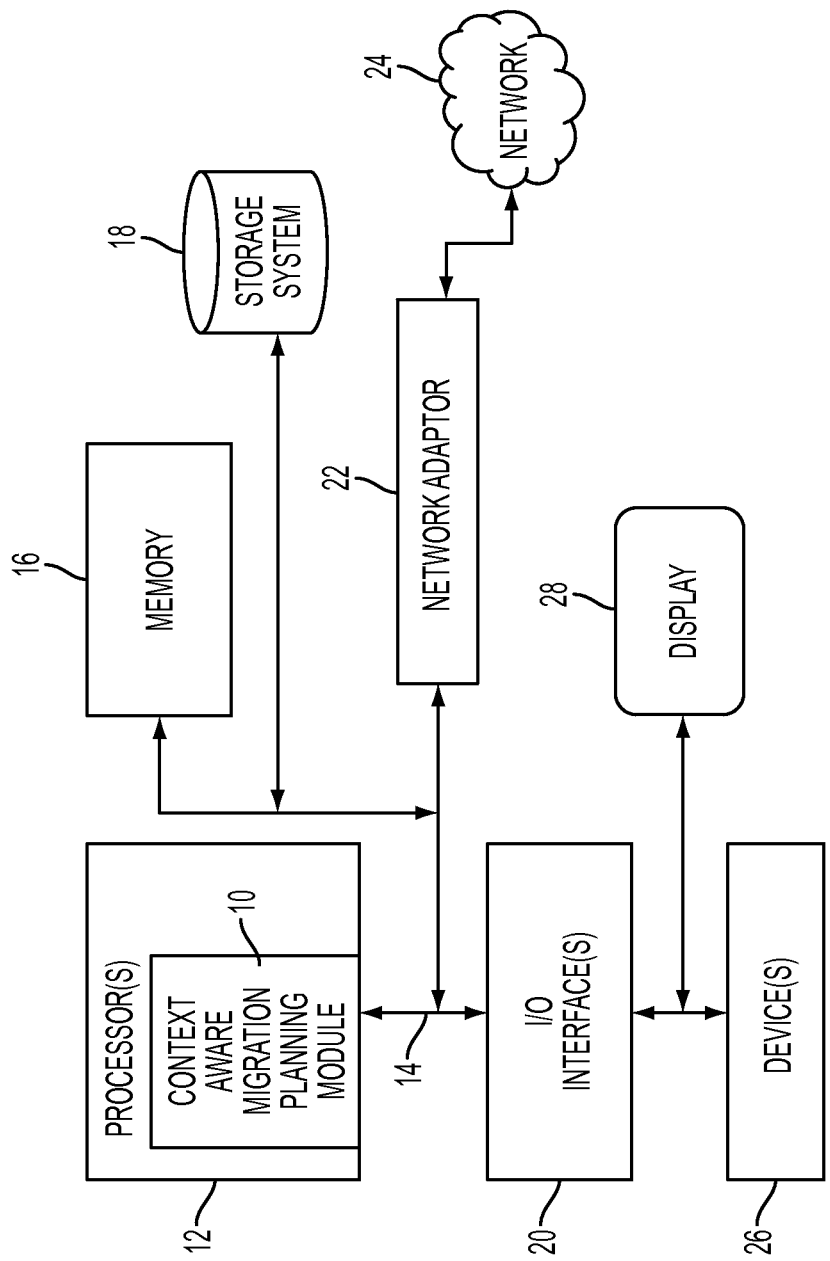
FIG. 4 illustrates a schematic of an example computer or processing system that may implement a dynamic context aware migration planning system in one embodiment of the present disclosure.

FIG. 4 illustrates a schematic of an example computer or processing system that may implement a context aware migration planning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of providing context aware dynamic composition of migration plans, comprising:
   receiving a request to migrate at least one of application and computer system image from a source environment;
   identifying a target environment and associated configuration;
   defining one or more contextual actions comprising a sequence of migration steps;
   allocating resources associated with the source environment and a schedule for triggering the one or more contextual actions;
   selecting automatically one or more migration techniques to use to implement the one or more contextual actions based on current context of the source environment and the target environment;
   monitoring an execution of migration performed according to the allocating and the selecting;
   responsive to detecting one or more exceptions in the execution of migration, regenerating a migration plan, the one or more exceptions comprising a component defined in the target definition missing from the target environment, and the regenerating the migration plan to include a contextual action comprising installing the missing component in the target environment; and
   automatically generating a migration template comprising learned patterns associated with a particular context learned based on semi-supervised machine learning observing historical data and user input;
   wherein the template captures one or more steps that apply in a given context, which can be reused in future;
   wherein the semi-supervised machine learning involves interactively querying a user to obtain outputs at new data points.

2. The method of claim 1, wherein the regenerating a migration plan comprises repeating the allocating and the selecting.

3. The method of claim 1, wherein the regenerating a migration plan comprises repeating the defining, the allocating and the selecting.

4. The method of claim 1, wherein the one or more exceptions comprises a change in one or more of the source environment and the target environment during the migration.

5. The method of claim 1, further comprising continuing to monitor one or more of the source environment and the target environment for changes, after completing of the migration.

6. The method of claim 5, further comprising responsive to detecting one or more of the changes, performing the regenerating of the migration plan based on detected one or more changes.

7. The method of claim 1, wherein the regenerating of the migration plan comprises selecting a different technical tool to implement the one or more contextual actions.

8. The method of claim 1, wherein responsive to detecting one or more exceptions in the execution of migration, the regenerating a migration plan comprises changing a migration technique selected from at least one of physical migration, image migration, application/workload migration, and data migration.

* * * * *